US008240732B2

(12) United States Patent
Bernart

(10) Patent No.: US 8,240,732 B2
(45) Date of Patent: Aug. 14, 2012

(54) TRAILER UTILITY BOX

(75) Inventor: Francis Bernart, North Canton, OH (US)

(73) Assignee: Cequent Consumer Products, Solon, OH (US)

(*) Notice: Subject to any disclaimer, the term of this patent is extended or adjusted under 35 U.S.C. 154(b) by 389 days.

(21) Appl. No.: 12/455,902

(22) Filed: Jun. 9, 2009

(65) Prior Publication Data
US 2010/0013257 A1   Jan. 21, 2010

Related U.S. Application Data

(60) Provisional application No. 61/131,414, filed on Jun. 9, 2008.

(51) Int. Cl.
B60R 11/06 (2006.01)
(52) U.S. Cl. ....................................................... 296/37.1
(58) Field of Classification Search ................ 296/37.1, 296/181.1, 181.2, 24.45, 37.6; 224/400, 224/402, 403, 404
See application file for complete search history.

(56) References Cited

U.S. PATENT DOCUMENTS

| | | | | |
|---|---|---|---|---|
| 2,811,111 A * | 10/1957 | Levitz et al. | | 104/126 |
| 3,492,042 A * | 1/1970 | Nachtigall, Jr. | | 296/24.45 |
| 3,734,540 A * | 5/1973 | Thiermann | | 280/482 |
| 4,055,206 A | 10/1977 | Griffin | | |
| 4,355,834 A * | 10/1982 | Alford | | 296/163 |
| 5,383,698 A | 1/1995 | Buchholz | | |
| 5,383,703 A * | 1/1995 | Irvine, III | | 296/24.45 |
| 5,439,313 A * | 8/1995 | Blaha et al. | | 404/75 |
| 5,544,944 A | 8/1996 | Keech | | |
| 5,833,295 A * | 11/1998 | Farlow, Jr. | | 296/22 |
| 5,845,952 A * | 12/1998 | Albertini et al. | | 296/37.6 |
| 6,030,018 A * | 2/2000 | Clare et al. | | 296/37.6 |
| 6,105,231 A * | 8/2000 | Clare et al. | | 29/434 |
| 6,142,549 A * | 11/2000 | Clare et al. | | 296/37.6 |
| 6,217,106 B1 * | 4/2001 | Reckner, Jr. | | 296/173 |
| 6,283,537 B1 * | 9/2001 | DeVore, III | | 296/182.1 |
| 6,416,101 B1 * | 7/2002 | Bartch | | 296/22 |
| 6,464,276 B1 * | 10/2002 | Gruich | | 296/37.6 |
| 6,565,165 B2 * | 5/2003 | Switkes | | 312/249.13 |
| 6,739,617 B1 * | 5/2004 | Martin | | 280/656 |
| 6,817,653 B2 * | 11/2004 | Ropp | | 296/186.2 |
| 7,055,880 B2 * | 6/2006 | Archer | | 296/37.1 |
| 7,159,893 B2 * | 1/2007 | Badger et al. | | 280/656 |
| 7,165,779 B2 * | 1/2007 | Badger et al. | | 280/656 |
| 7,461,884 B2 * | 12/2008 | Clare et al. | | 296/37.6 |
| 7,810,866 B2 * | 10/2010 | Dempsey et al. | | 296/173 |
| 7,823,948 B2 * | 11/2010 | Redman et al. | | 296/37.6 |

* cited by examiner

Primary Examiner — Kiran B Patel
(74) Attorney, Agent, or Firm — McDonald Hopkins LLC

(57) ABSTRACT

The present invention is directed to a modular storage system for storing items on a trailer. The modular storage system includes a plurality of containers connected to the railing of a trailer. The containers may be modular so as to be selectively arrangeable along the railing. The containers may be connected to the outside or inside of the railing. At least one of the containers may be positioned over a wheel of the trailer and include a wheel well for housing and protecting the wheel. The containers may include lockable lids for protecting the stored items. The containers may further include one or more attachments, such as a tool rack or T-mount.

20 Claims, 5 Drawing Sheets

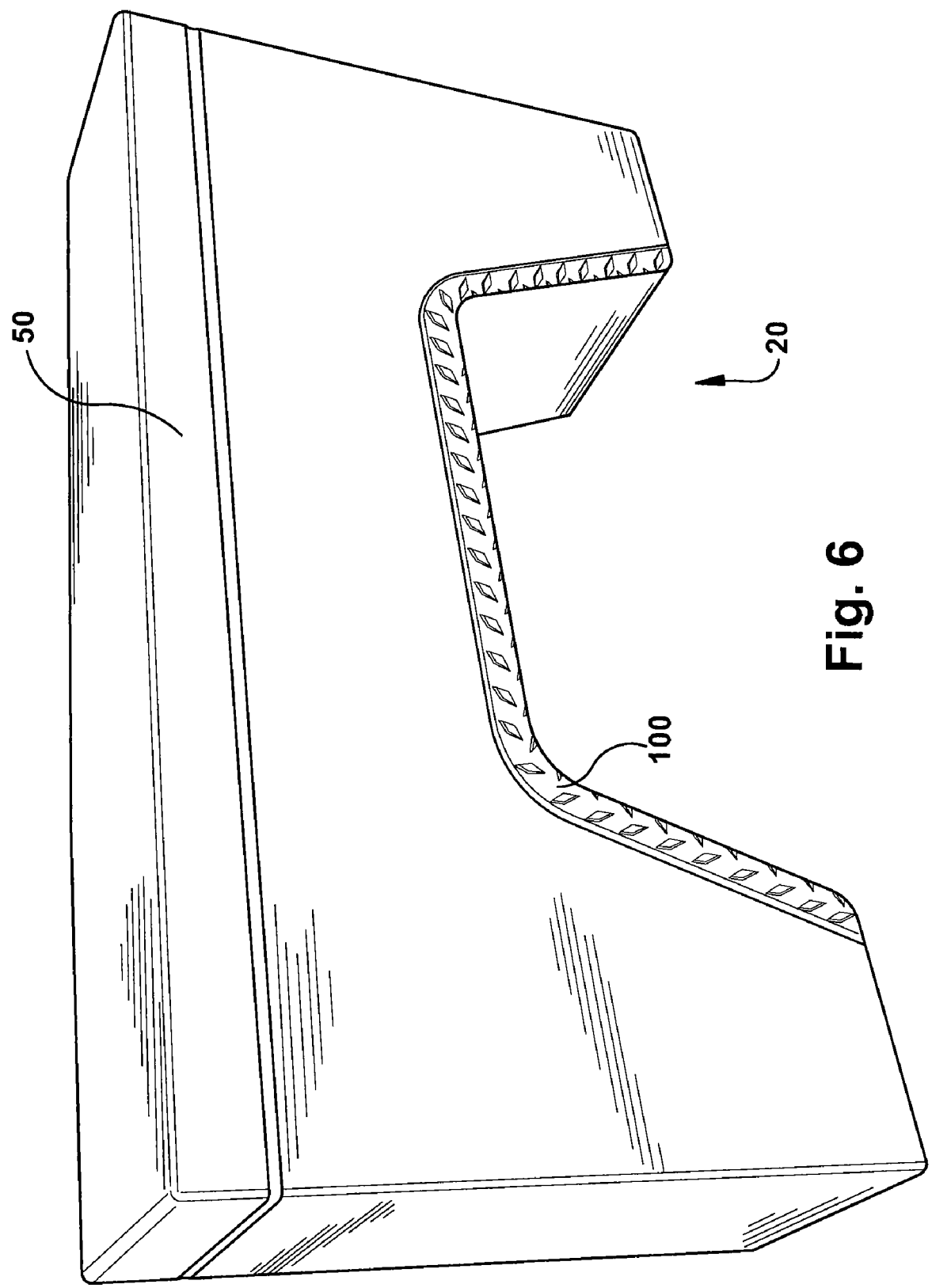

TRAILER UTILITY BOX

CROSS-REFERENCE TO RELATED APPLICATION

This application claims benefit from U.S. Provisional Patent Application No. 61/131,414, entitled "Trailer Utility Box," filed on Jun. 9, 2008, which is hereby incorporated in its entirety by reference.

FIELD OF INVENTION

The present invention relates generally to a utility box, and more specifically, to a novel utility box for trailers.

BACKGROUND

Tradesmen such as construction workers, plumbers, electricians, and farmers often use trucks to not only transport equipment to a job site, but also to work with or install what they transport. Therefore the truck must also function as a mobile shop, in which the truck is required to be able to store tools and small hardware items like screws, nails and fittings.

To satisfy such a need, truck utility boxes have been provided for installation on truck beds. However, truck utility boxes suffer a variety of deficiencies. For example, truck utility boxes are secured to the truck bed, thereby decreasing the overall cargo space for transporting items. Further, truck utility boxes do not provide sufficient storage space for special tools or items associated with trailers to be towed by the trucks. For example, if the truck is connected to a trailer requiring special tools, the contents of the truck utility box must be removed or left unprotected on the truck bed. Further, each time the truck is connected to a different trailer, the items or tools associated with the trailers must be exchanged or left unprotected.

Therefore, a need exists for a trailer utility box that is capable of storing tools and various other items on or along a trailer. Further, a need exists for a trailer utility box that does not decrease the cargo space and overall transport capability of the trailer.

BRIEF DESCRIPTION OF THE DRAWINGS

Objects and advantages together with the operation of the invention may be better understood by reference to the following detailed description taken in connection with the following illustrations, wherein:

FIG. 6 illustrates a perspective view of a utility box having a wheel well.

SUMMARY OF INVENTION

The present invention is directed to a modular storage system for storing items on a trailer. An embodiment of the present invention includes a trailer having a flat bed and a railing along the sides of the flat bed. A plurality of containers having storage compartments are attached to the railing. The containers may be modular so as to be selectively arranged along the railing. The containers may be connected to the outside or inside of the railing. At least one of the containers may be positioned over a wheel of the trailer and include a wheel well for housing and protecting the wheel. The containers may include lockable lids for protecting the stored items. The containers may further include one or more attachments, such as a tool rack or T-mount.

DETAILED DESCRIPTION

While the invention is described with reference to trailer utility boxes, it should be clear that the invention should not be limited to such uses or embodiments. The description herein is merely illustrative of an embodiment of the invention and in no way should limit the scope of the invention.

Figure 1:
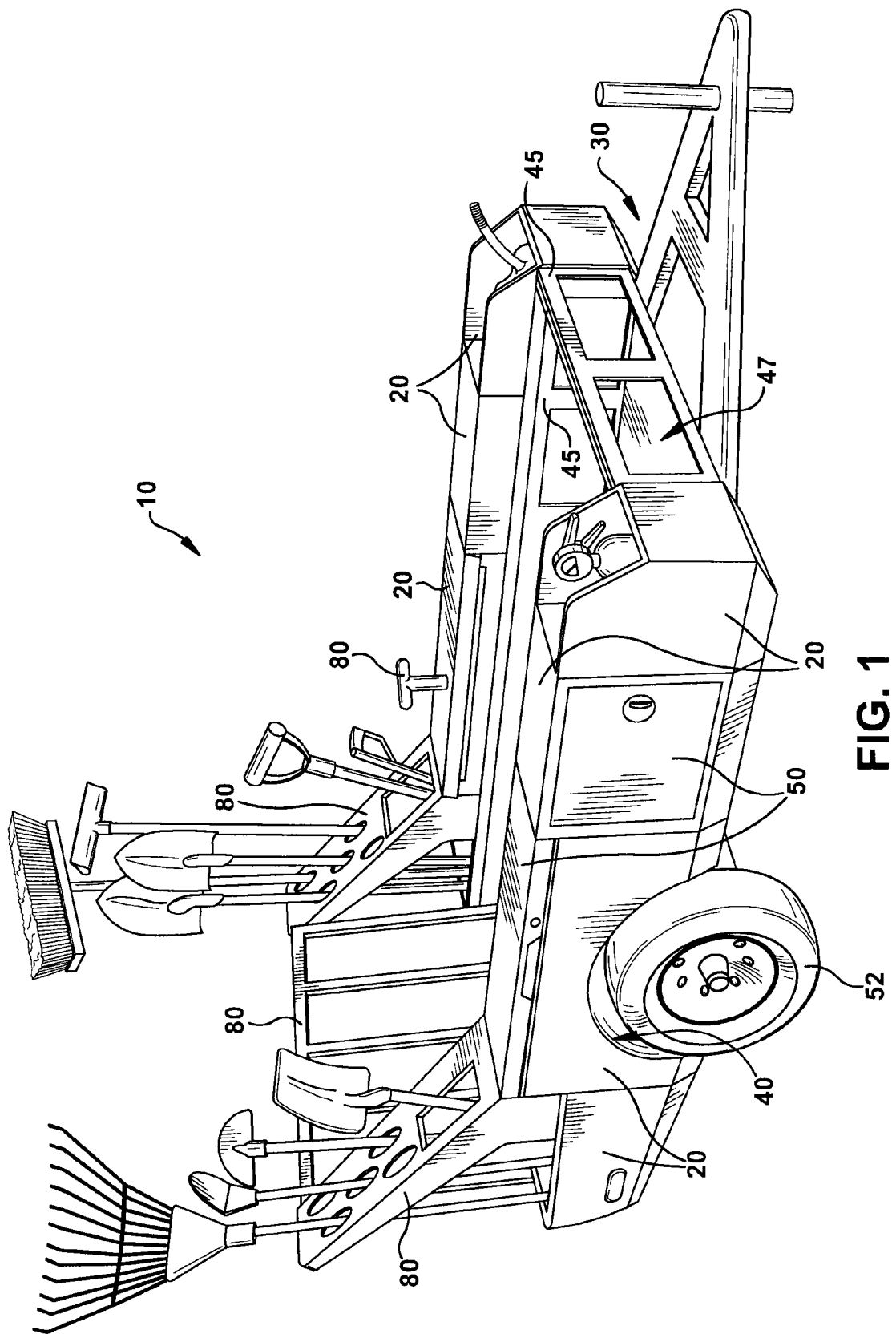
FIG. 1 illustrates a perspective view of a trailer utility box in an embodiment of the present invention.

FIGS. 1-5 illustrate a trailer utility box 10 ("utility box 10") in accordance with the present invention. As shown in FIG. 1, the utility box 10 may include one or more containers 20 capable of being secured to a trailer 30. The attachment of containers 20 to the trailer 30 may form a modular storage system. The containers 20 may also be attached to one another, by any appropriate means. A modular component system may be beneficial as one container 20 to as many containers 20 as desired or appropriate may be installed onto the trailer 30.

The containers 20 may be secured to the trailer 30 by any appropriate means, such as with fasteners, such as bolts, screws, and nuts, welds, adhesives, or may be frictionally attached such as by a snap fit, or the like, for example. In addition, the utility box 10 or containers 20 may be integrally formed with or separate pieces from the trailer 30. Integrally forming the utility box 10 or containers with the trailer 30 may minimize the footprint of the utility box 10 without detracting from the appearance of the trailer 30. The utility box 10 may be secured at any appropriate location, such as anywhere on or along the inside or outside of the trailer 30, for example.

Figure 2:
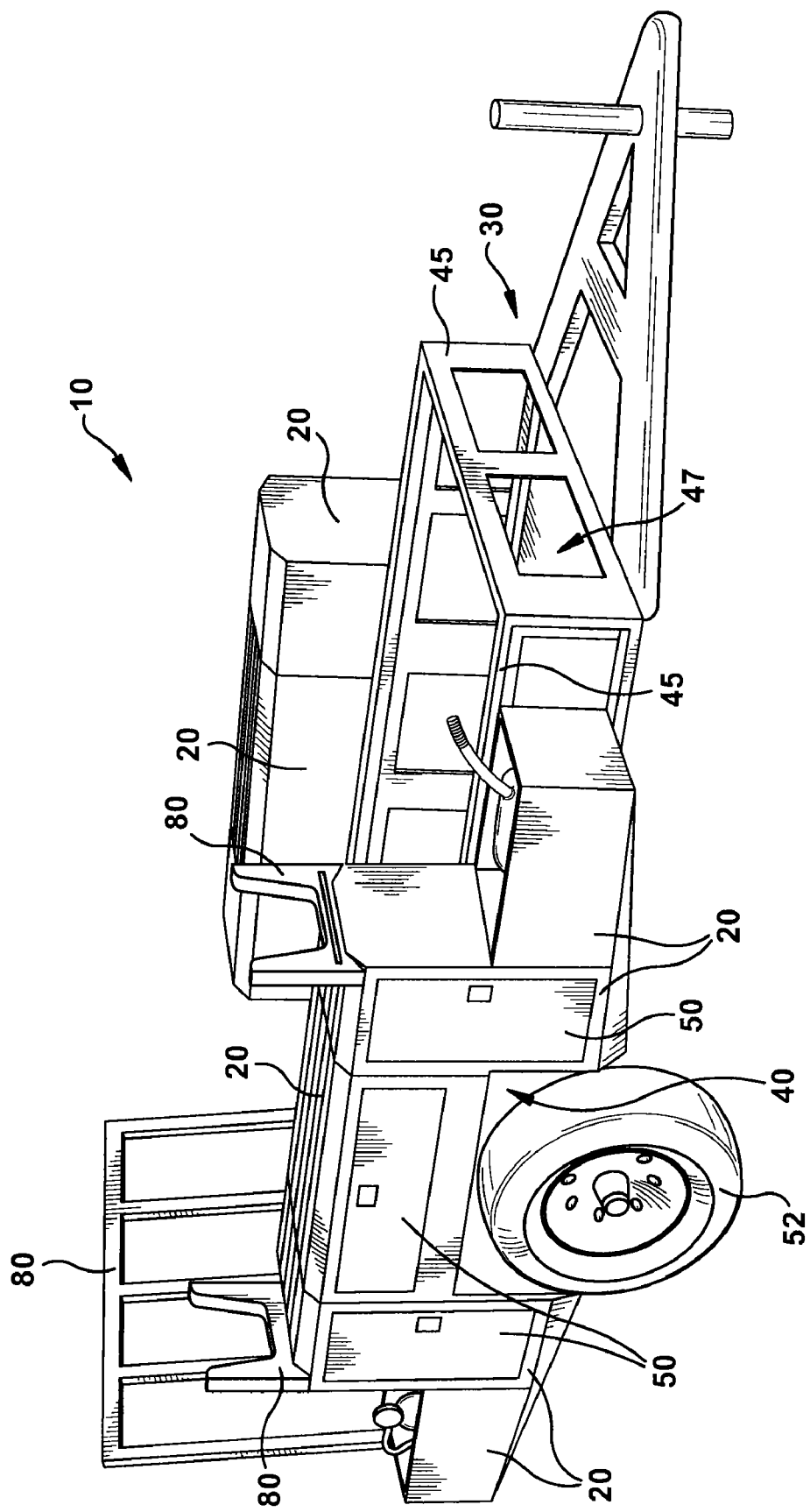
FIG. 2 illustrates a perspective view of a trailer utility box in an embodiment of the present invention.

The trailer 30 may include a cargo bed 47. As best shown in FIG. 1, the utility box 10 may be secured to a railing 45 outside of the cargo bed 47 of the trailer 30. The trailer 30 may include a periphery 32 that may generally circumscribe an exterior 33 of the trailer 30, or more specifically, the cargo bed 47 as best shown in FIG. 2. The railing 45 may be attached to the trailer 30 along at least portions of the periphery 32 as best shown in FIG. 2. The railing 45 may be attached to the trailer 30 through generally vertically extending members 46 being attached to the trailer 30. The generally vertically extending members 46 may be positioned around the periphery 32 of the trailer 30. The railing 45 may be attached to the generally vertically extending members 46 in any appropriate manner. Securing the utility box 10 on a railing 45 outside of the cargo bed 47 may provide greater storage space without decreasing the towing capacity of the trailer 30. It is to be understood that the utility box 10 may be removably or fixedly secured to the trailer 30. In addition, the utility box 10 may be removably or fixedly secured to the trailer 30 by any appropriate means. In a non-limiting example, the utility box 10 may be secured to the trailer 30 with fasteners, such as bolts, screws, and nuts, welds, adhesives or the like, for example.

As shown in FIG. 1, the utility box 10 may include a variety of different sized and shaped containers 20. The various containers 20 may store any appropriate type of items, such as tools and other items such as fuel containers, fire extinguishers, rags or towels, first aid kits, rubbish, and the like, for example. It is to be understood that the storage containers 20 may be fabricated from any suitable material including, but not limited to, wood, metal, plastic, composites, and the like, for example. The containers 20 may be of any appropriate shape or size, such as rectangular, square, circular, and the like, for example.

The containers 20 may also be provided with doors or lids 50 and locks (not shown). The lids 50 may protect the contents of the container 20. The lids 50 may be made of out any appropriate material or process, such as being made out of metal, wood, plastic or the like, such as by injection, rotational or blow molding, thermo-forming, or the like, for example. Rotational molding or rotomolding is a versatile process for creating many kinds of items, typically out of plastic.

Rotational molding may utilize a heated mold that causes the material within to melt and form a puddle at the bottom of the mold cavity. The mold is then slowly rotated (usually around two perpendicular axes) causing the melted material to flow into to the mold and stick to its walls. In order to maintain even thickness throughout the part, the mold continues to rotate during the cooling phase. Rotomolding may be beneficial since it is corrosion and chemical resistant, durable, economical, and aesthetically pleasing.

The locks associated with the doors or lids 50 may secure the contents within the containers 20. The locks may be of any appropriate type of lock on the market, such as a keypad, combination lock, key lock, and the like, for example. Lockable storage compartments may be utilized for any appropriate means, such as for storing expensive power tools, personal belongings, and the like, for example.

Figure 5:
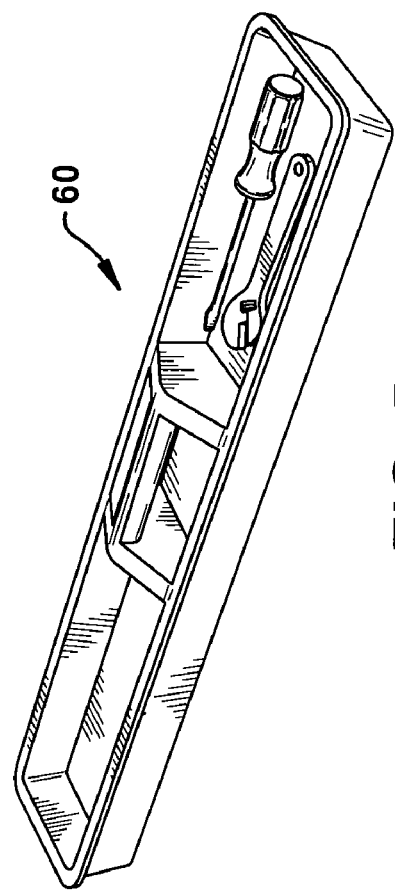
FIG. 5 illustrates a side view of a trailer utility box in an embodiment of the present invention.

With reference to FIG. 5, the containers 20 may include any appropriate type of dividers or organizers 60, such as shelves, compartments, tool organizers, removable trays or inserts, removable dividers, and the like. For example, some of the containers 20 may also contain removable toolboxes (not shown).

In a non-limiting example, one or more of the containers 20 may be insulated for keeping items stored therein hot or cold. In another non-limiting example, the containers 20 may be refrigerated, heated, or both. It is to be understood that the utility box 10 may also be provided with a battery to operate such devices, or with a plug to connect to the battery of the towing vehicle.

In another example, the container 20 may contain a reel (not shown) having a cord, cable, rope, or the like, for securing items to be transported to the trailer 30. The reel may include a ratcheting mechanism (not shown) or a motor for operating the reel as a winch. In yet another embodiment, the reel may be provided with a hose and one of the containers 20 may contain a pump (not shown). Such a configuration may be used to dispense liquids that may be transported on the trailer 30 or stored in one of the containers 20.

In a non-limiting example, the utility box 10 may be modular in design, allowing any number of containers 20 to form the utility box 10. Such a configuration may provide for flexibility, as various types of containers 20 may be added or removed as needed. For example, the containers 20 may be removed to accommodate oversized or heavy items to be towed on the trailer 30. In another example, such a modular configuration allows one or all of the containers 20 to be transferred and secured to another utility box 10 that may be secured to a different trailer.

FIG. 2 illustrates a perspective view of the trailer utility box 10 in an embodiment. The trailer utility box 10 may include metal cabinets or containers 20 with doors or lids 50. The utility box 10 may further include an attachment 80, such as a ladder or tool rack. The ladder or tool rack may be made out of any appropriate material or means, such as being injection molded, for example. In addition, a variety of containers or cabinets 20 may be utilized to form a wheel well 40, such as by using three cabinets to form a recessed wheel well 40.

Figure 3:
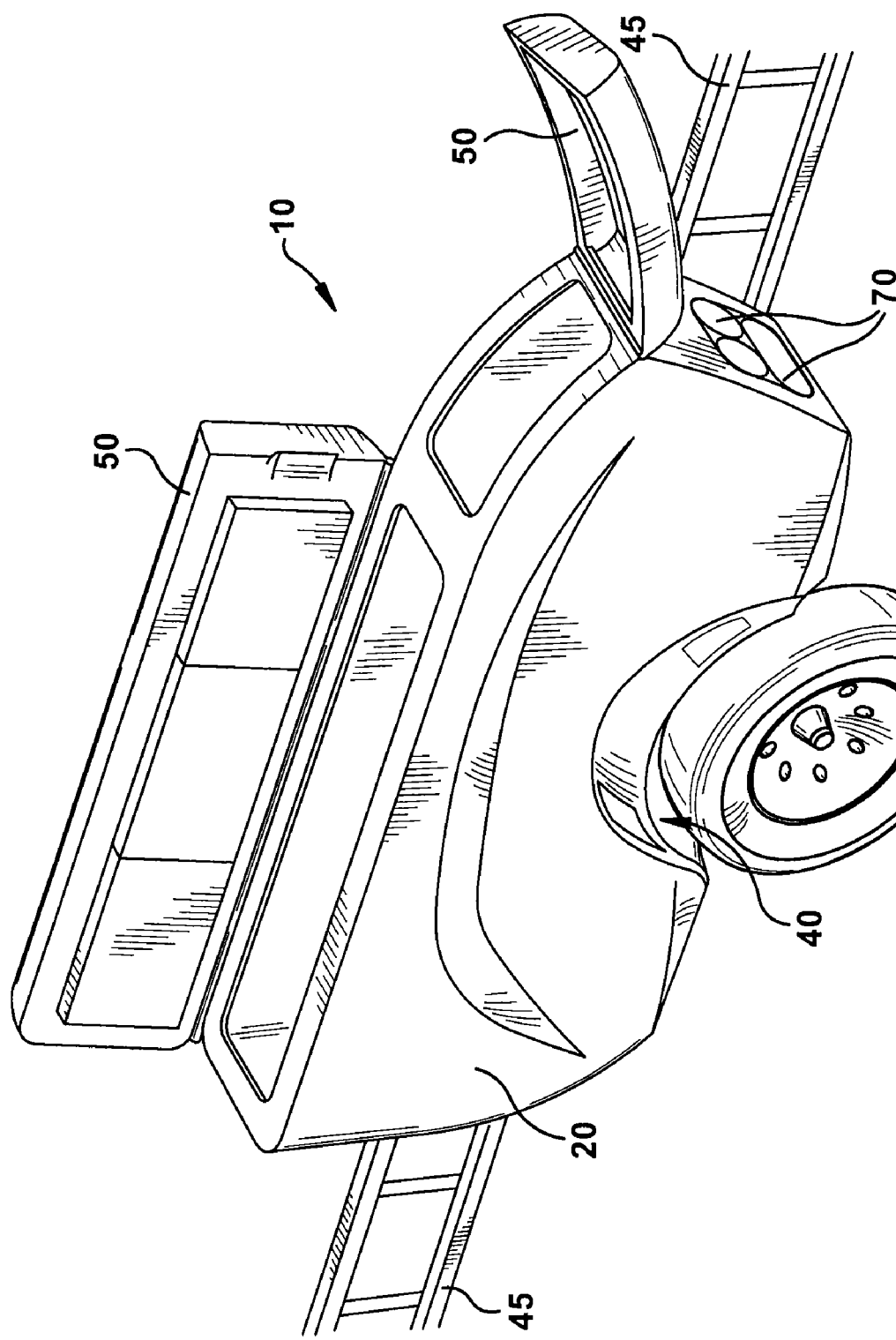
FIG. 3 illustrates a partial view of a trailer utility box in an embodiment of the present invention.

In another embodiment, as best shown in FIG. 3, the utility box 10 may be integrally formed with a part of the trailer 30. For example, the utility box 10 may be integrally formed with (or otherwise formed with) the wheel well 40 of the trailer 30. As many trailers are supplied without wheel wells 40, the utility box 10 may be secured to the outside of the trailer 30 not only to provide additional storage space, but also to protect the trailer wheels 52.

Figure 4:
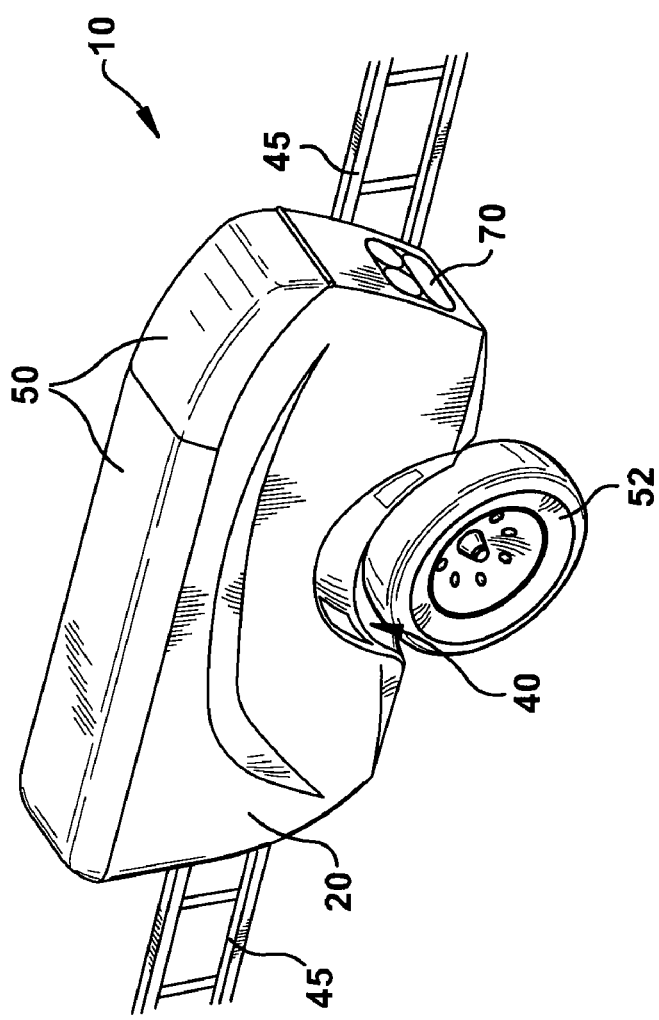
FIG. 4 illustrates is a side view of a trailer utility box in an embodiment of the present invention.

As shown in FIGS. 3 and 4, the container 20 may be provided as over the wheel storage. The container 20 may also include at least one lid 50. With reference to FIG. 5, and as discussed above, the container 20 may also include an interior component 60, such as a tray, divider, or the like, for example. The tray 60 may be made out of any appropriate material or process, such as metal, plastic, or the like, and made by injection or blow molding, and the like, for example. The tray 60 may be of any appropriate shape or size to fit within the container 20. The tray 60 may be used for any appropriate purpose such as for storing small items or tools, for example.

With further reference to FIGS. 3 and 4, the utility box 10 may be provided with reflectors and/or lights 70. The lights 70 may be separate from or assembled to the containers 20. The reflectors and/or lights 70 may include, but are not limited to, tail lights, turn signal lights, brake lights, backup lights, hazard warning lights, reflectors and the like, for example. The utility box 10 may also be provided with an electrical plug (not shown). The electrical plug may connect to the electrical interface connector of the towing vehicle (not shown). Thus, the utility box 10 may be used to upgrade basic trailer models that may not have electrical systems or lighting.

As an alternative, the utility box 10 may be provided with lighting (not shown) on the inside of the containers 20. In yet another non-limiting example, the containers 20 may also be provided with external lighting (not shown). For example, external lighting located in or around the wheel well 40 may be provided to assist a person working on or around the tire 52. Moreover, one of the containers 20 may be provided with a reel-style trouble light (not shown) for extending beyond the trailer 30 area.

FIG. 6 illustrates a utility box 10 that may be capable of being secured to a trailer 30 as a wheel well 40. As shown, the utility box 10 may be provided with a lid 50 for accessing the internal compartment. The utility box 10 may also be provided with a protective lining 100 about the wheel-well surface that surrounds the tire 52. It is to be understood that the lining 100 may be comprised of any appropriate material including, but not limited to, metal, heavy duty plastics, composites, and the like. It is also to be understood that the utility box 10 may be provided with a variety of other appropriate types of reinforcements to protect both the trailer 30 and the contents therein, and should not be limited to those discussed herein.

As an alternative, the utility box 10 may also contain one or more attachments 80. The attachments 80 may be of any appropriate shape or size and for any appropriate purpose. For example, an attachment 80 may be provided that is capable of securing tools such as rakes, shovels, brooms, hammers, and the like. As shown in FIG. 1, the attachment 80 may be angled with respect to the utility box 10 to accommodate tools having a variety of different lengths.

Other attachments 80 may also be provided, such as a cleat, d-mount, t-mount, or the like. Such attachments 80 may allow ropes, bungee cords, and the like to be connected to the utility box 10 to secure items to the trailer 30. Other attachments may include, but are not limited to, spare tire mounts, ladder racks, and the like, for example, it is to be understood that the attachments 80 shown and described herein are illustrative only and the embodiments should not be limited to such.

Although the preferred embodiment of the present invention has been illustrated in the accompanying drawing and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, I claim:

1. A modular storage system comprising:
    a trailer having a flat bed, said flat bed having an outer periphery generally circumscribing an exterior of said flat bed;
    a member extending generally vertically from at least a portion of said periphery, said member having at least one railing;
    a plurality of containers connected to said at least one railing, said containers including compartments for storage;
    wherein said containers are connected to an outer portion of said railing such that said containers generally extend outside of said outer periphery of said flat bed; and
    further wherein said plurality of containers are selectively arrangeable along said at least one railing.

2. The modular storage system of claim 1, wherein at least one of said plurality of containers is removably connected to said at least one railing.

3. The modular storage system of claim 2, wherein at least one of said plurality of containers includes a wheel well integrally formed therein.

4. The modular storage system of claim 3, wherein at least one of said plurality of containers includes a lid.

5. The modular storage system of claim 4, wherein said lid includes a lock.

6. The modular storage system of claim 5, wherein at least one of said plurality of containers includes an exterior light.

7. The modular storage system of claim 6, wherein said trailer further includes an attachment.

8. The modular storage system of claim 7, wherein said attachment includes a rack having openings for storing various tools.

9. The modular storage system of claim 8, wherein said attachment includes a T-mount.

10. A modular storage system comprising:
    a trailer comprising:
        a flat bed;
        a periphery generally circumscribing an exterior of said flat bed;
        at least one wheel connected to said trailer; and
        a member extending generally vertically from at least a portion of said periphery, wherein said member includes a railing;
    at least one container connected to an outer portion of said railing and generally extending outside of said periphery such that said flat bed is substantially unobstructed by said at least one container, said at least one container including a storage compartment;
    a recessed wheel well formed in said at least one container; and
    wherein said at least one container is selectively arrangeable along said railing.

11. The modular storage system of claim 10, wherein said at least one container is removably connected to said railing.

12. The modular storage system of claim 10, wherein said at least one container includes a lockable lid.

13. The modular storage system of claim 10, wherein said at least one container includes an exterior light.

14. The modular storage system of claim 10 wherein said at least one container is capable of being positioned above said wheel of said trailer.

15. The modular storage system of claim 10 further comprising a plurality of storage containers selectively connectable to a plurality of positions along said railing.

16. The modular storage system of claim 10, wherein said at least one container is integrally formed with said trailer.

17. A modular storage system for a trailer, the trailer having a flat bed, a periphery generally circumscribing an exterior of the flat bed, and a member extending generally vertically from at least a portion of the periphery, wherein the member includes a railing, the modular storage system comprising:
    a plurality of containers removably connectable to the railing such that said containers extend generally outside of the periphery when connected to the railing;
    wherein said containers include storage compartments; and
    wherein said containers are selectively arrangeable along the railing.

18. The modular storage system of claim 17 wherein at least one of said containers includes a recessed wheel well formed therein.

19. The modular storage system of claim 18 further comprising a protective member covering at least a portion of said recessed wheel well in said at least one container.

20. The modular storage system of claim 17 further comprising a tray positionable within at least one of said containers.

* * * * *